United States Patent
Sakurai et al.

(10) Patent No.: US 11,137,594 B2
(45) Date of Patent: Oct. 5, 2021

(54) IRRADIATION APPARATUS

(71) Applicant: Stanley Electric Co., Ltd., Tokyo (JP)

(72) Inventors: Makoto Sakurai, Tokyo (JP); Mamoru Miyachi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 179 days.

(21) Appl. No.: 16/514,410

(22) Filed: Jul. 17, 2019

(65) Prior Publication Data

US 2020/0026067 A1 Jan. 23, 2020

(30) Foreign Application Priority Data

Jul. 19, 2018 (JP) .............................. JP2018-135555

(51) Int. Cl.
*G02B 26/08* (2006.01)
*F21S 41/675* (2018.01)

(52) U.S. Cl.
CPC ........ *G02B 26/0858* (2013.01); *F21S 41/675* (2018.01)

(58) Field of Classification Search
CPC combination set(s) only.
See application file for complete search history.

(56) References Cited

U.S. PATENT DOCUMENTS

2017/0127033 A1* 5/2017 Saito ................... G02B 26/101

FOREIGN PATENT DOCUMENTS

| JP | 2008-65191 A | 3/2008 |
|----|--------------|--------|
| JP | 2010-197662 A | 9/2010 |
| JP | 2011-237707 A | 11/2011 |
| JP | 2017-134133 A | 8/2017 |
| JP | 2017-173622 A | 9/2017 |
| JP | 2018-54752 A | 4/2018 |

OTHER PUBLICATIONS

Extended European Search Report dated Jan. 3, 2020 issued in corresponding European patent application No. 19187035.1.

* cited by examiner

*Primary Examiner* — Euncha P Cherry
(74) *Attorney, Agent, or Firm* — Kenealy Vaidya LLP

(57) ABSTRACT

There is provided an irradiation apparatus 1 including a laser light source 6, a light deflector 7, and a control unit 8. The light deflector 7 has a piezoelectric actuator 74 that include a plurality of piezoelectric cantilevers 79 in a meandering pattern arrangement. In the control unit 8, the driving voltage control unit 14 stops supplying a driving voltage to some piezoelectric cantilevers 79 when a designated drawing area designated by the drawing area designating unit 15 is an upper drawing area Fu and a lower drawing area Fd that are partial drawing areas.

5 Claims, 5 Drawing Sheets

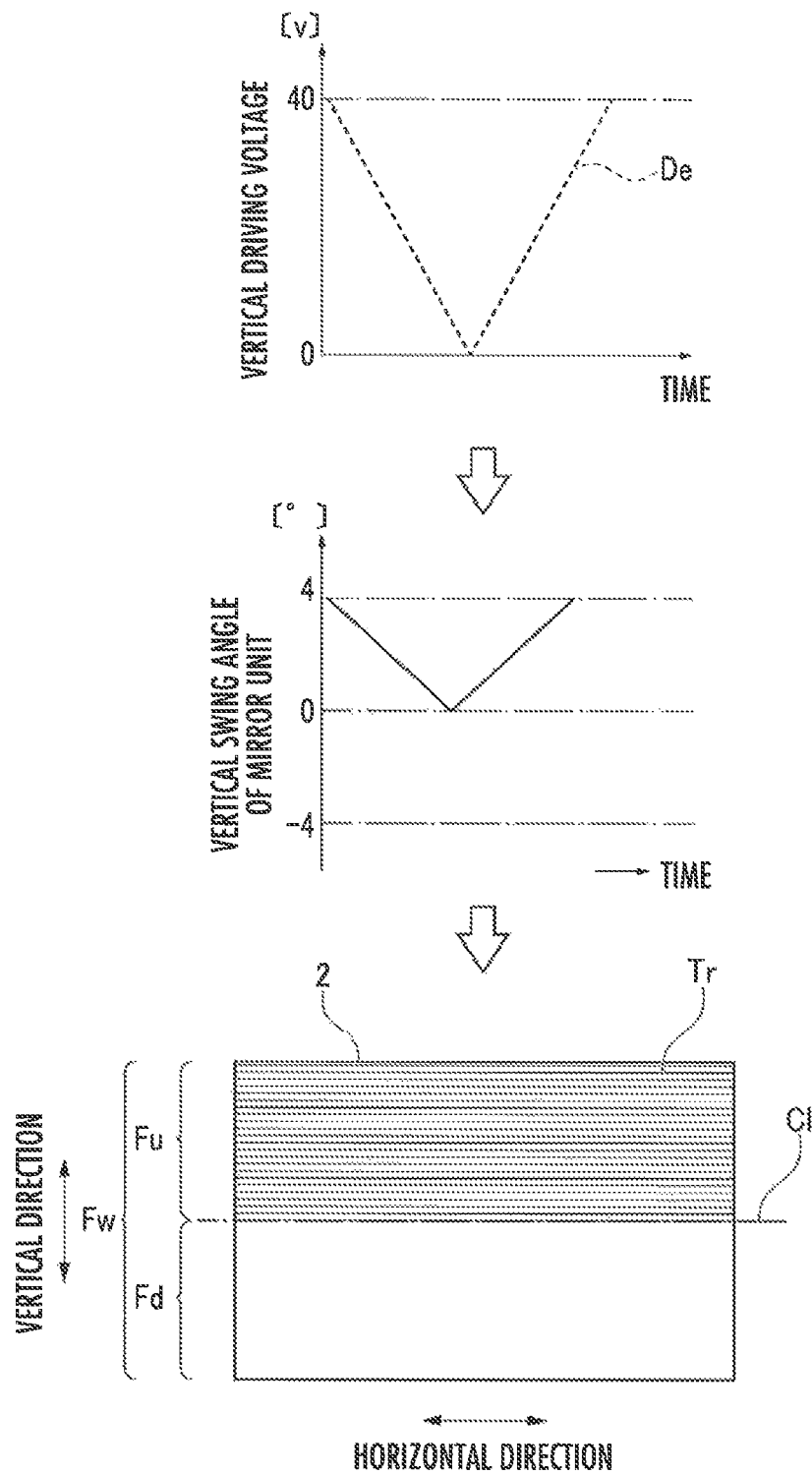

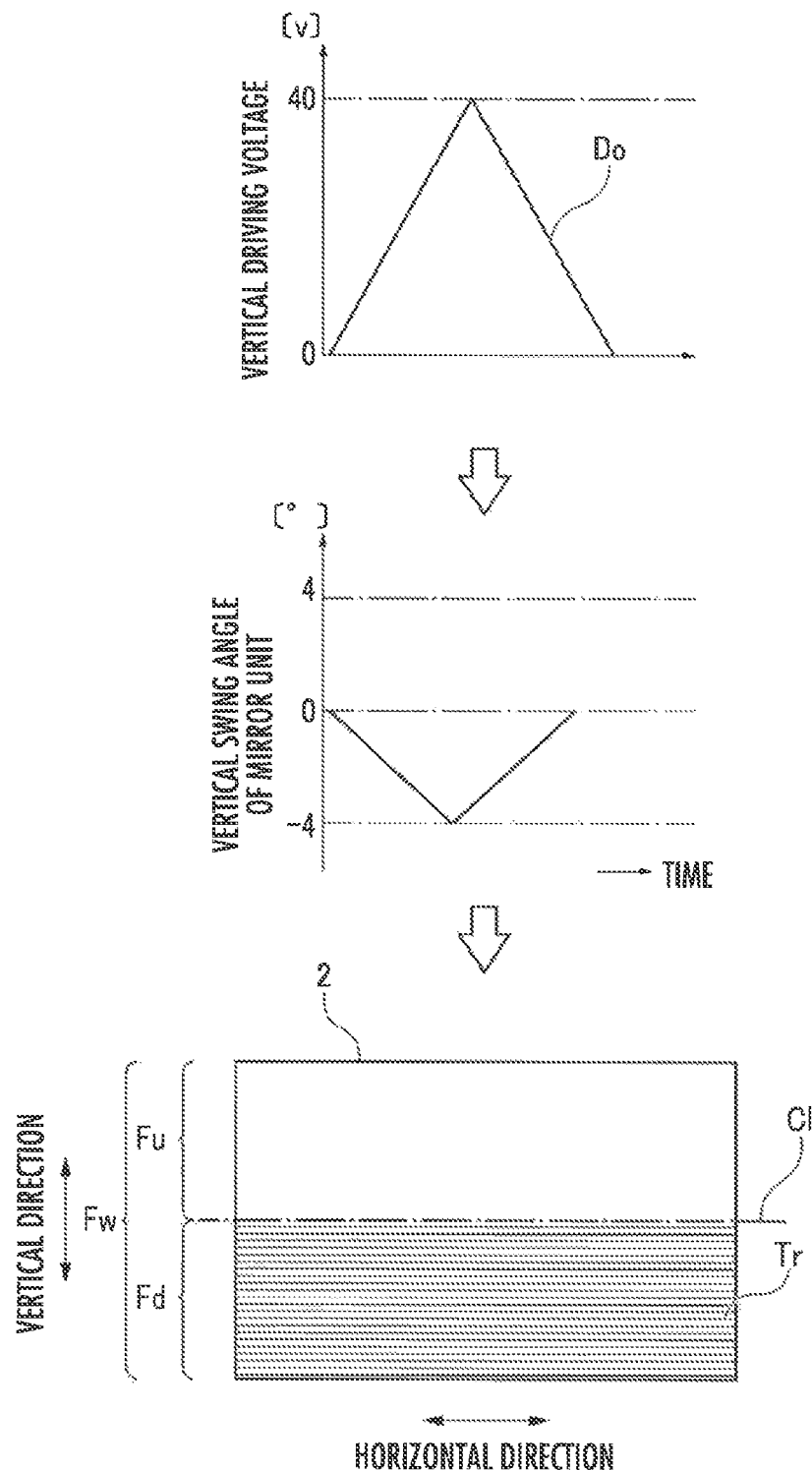

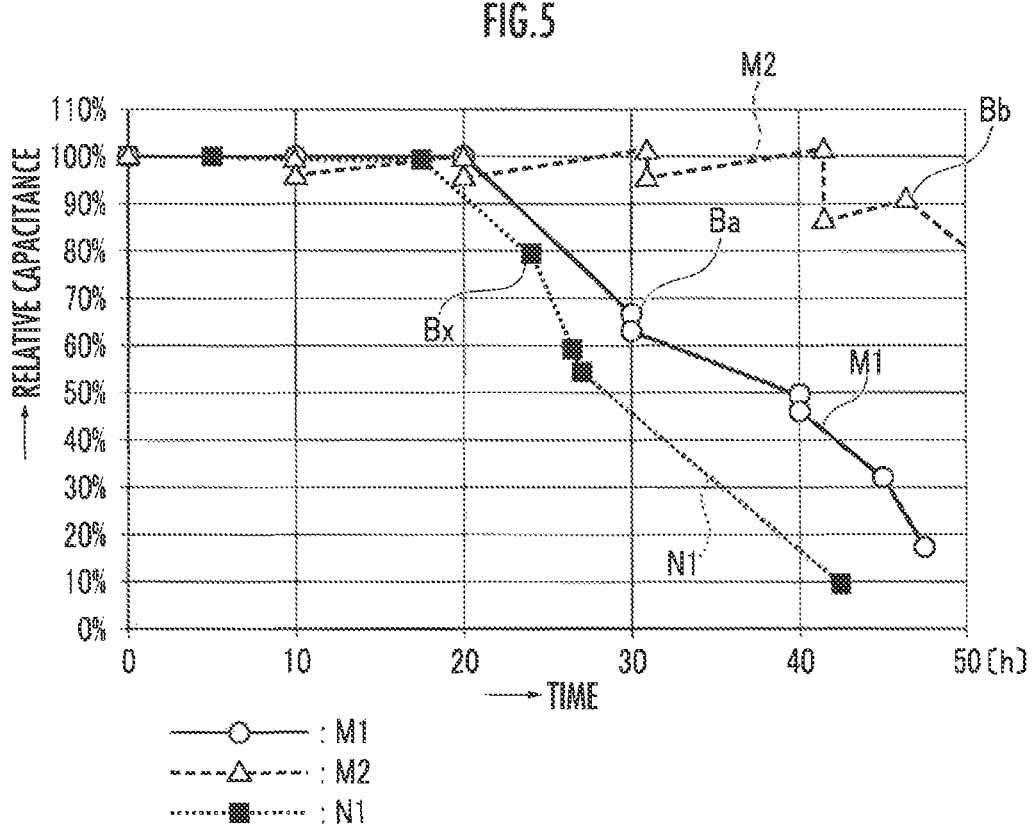

IRRADIATION APPARATUS

BACKGROUND OF THE INVENTION

1. Field of the Invention

The present invention relates to an irradiation apparatus that radiates a scanning light, using a light deflector.

2. Description of the Related Art

For image irradiation apparatuses and vehicle headlights, there is known an irradiation apparatus that radiates a scanning light, using a Micro Electro Mechanical Systems (MEMS) light deflector for formation of images and light distribution patterns (for example, JP P2008-65191A, JP P2011-237707A, JP P2017-173622A, JP P2010-197662A and JP P2018-54752A).

The light deflector disclosed in JP P2008-65191A, JP P2011-237707A, JP P2017-173622A and JP P2010-197662A changes the amplitude and the amount of change (for example, the difference between a maximum value and a minimum value) of a driving voltage when scanning different scan ranges with a scanning light.

JP P2010-197662A and JP P2018-54752A disclose a light deflector including an actuator including a plurality of piezoelectric cantilevers serially connected in a meandering pattern arrangement. The actuator drives a mirror unit so that the mirror unit reciprocatively rotates around a rotation axial line.

In the light deflector of a vehicle headlight disclosed in JP P2018-54752A, the plurality of serially connected piezoelectric cantilevers in the meandering pattern arrangement are divided into two groups, namely, an odd-numbered group and an even-numbered group, according to the order in disposition. The vehicle headlight can freely switch the irradiation range between above and below a reference line. During a period when the upper irradiation range alone is irradiated, supply of a driving voltage to the piezoelectric cantilevers in one group of the two groups is effected, and supply of a driving voltage to those in the other group is stopped. Meanwhile, during a period when the lower irradiation range alone is irradiated, supply of a driving voltage to the piezoelectric cantilevers in the one group is stopped, and supply of a driving voltage to those in the other group is effected.

In an MEMS light deflector, the temperature inside a package becomes very high while the MEMS light deflector is in operation as the reflection rate of the mirror unit is not 100%. In general, PZT (lead zirconate titanate) is used as a material of a piezoelectric film of a piezoelectric actuator in the MEMS light deflector. Hence, the lead in the piezoelectric film is attracted toward the cathode layer in a high electric field at high temperature. Consequently, more lead tends to unevenly accumulate near the cathode layer. Such an uneven distribution will cause separation of the piezoelectric film from the cathode layer.

For improvement of the service life of the piezoelectric cantilever of a light deflector, it is effective to discretionally suspend the piezoelectric cantilever. However, suspension of all piezoelectric cantilevers, as in JP P2010-197662A, makes irradiation hardly achievable.

The vehicle headlight disclosed in JP P2018-54752A suspends half of the plurality of piezoelectric cantilevers when the irradiation area is above or below the reference line. In the case of vehicle headlights, however, the dimension of the irradiation area needs to be maintained the same as the dimension of a standard irradiation area irrespective of whether the irradiation area is above or below the reference line. Accordingly, during a period with the irradiation area being located either above or below the reference line, the operating piezoelectric cantilevers should receive a twofold driving voltage to compensate for the shortage in the amount of deformation of the suspended piezoelectric cantilevers while the suspended piezoelectric cantilevers are suspended. This can increase a load on the operating piezoelectric cantilevers.

SUMMARY OF THE INVENTION

The object of the present invention is to provide an irradiation apparatus that improves the reliability of a light deflector by preventing increase in load on some piezoelectric cantilevers, while preventing suspension of irradiation.

In one aspect of the present invention, an irradiation apparatus includes:

a light source;

a light deflector including a mirror unit which reciprocatively rotates around a rotation axial line and reflects an incident light from the light source to radiate a scanning light, and a piezoelectric actuator having a plurality of piezoelectric cantilevers serially connected in a meandering pattern arrangement, the piezoelectric actuator being configured to actuate the piezoelectric cantilevers with a driving voltage supplied from outside to cause the mirror unit to reciprocatively rotate around the rotation axial line;

a drawing area designating unit which designates a designated drawing area, scanned by the scanning light, among a standard drawing area, a first partial drawing area and a second partial drawing area, the first partial drawing area and the second partial drawing area being located inside the standard drawing area in different positions;

a light source control unit which controls the brightness of the light source according to the designated drawing area; and a driving voltage control unit which controls combinations of operating piezoelectric cantilevers supplied with the driving voltage and suspended piezoelectric cantilevers not supplied with the driving voltage, the combinations including: a standard combination, corresponding to the standard drawing area, of both one and the other parts of the plurality of piezoelectric cantilevers being the operating piezoelectric cantilevers; a first combination, corresponding to the first partial drawing area, of the one and the other parts being the operating and the suspending piezoelectric cantilevers respectively; and a second combination of the one and the other parts being the suspending and the operating piezoelectric cantilevers respectively.

According to the one aspect, during a period with the standard drawing area designated, all the plurality of piezoelectric cantilevers of the piezoelectric actuator of the light deflector are operating piezoelectric cantilevers. Meanwhile, during respective periods with the first partial drawing area and the second partial drawing area designated, the first partial drawing area and the second partial drawing area being located inside the standard drawing area in different positions, the combination of the operating piezoelectric cantilever and the suspended piezoelectric cantilever is a first combination and a second combination, respectively, in which some piezoelectric cantilevers are suspended. Meanwhile, the mirror unit receives light from the light source to maintain drawing also during the respective periods with the first partial drawing area and the second partial drawing area designated. This generates heat, and the piezoelectric cantilevers are kept at high temperature. Consequently, during the respective periods with the first partial drawing area and the second partial drawing area designated, the suspended piezoelectric cantilevers are placed at high temperature with no electric field. This causes the material (for example, lead) that causes separation in the piezoelectric film to be thermally diffused during the respective periods with the first partial drawing area and the second partial drawing area designated, whereby the uneven distribution of the material in the piezoelectric body is eliminated.

The first partial drawing area and the second partial drawing area are partial drawing areas of the standard drawing area and located inside the standard drawing area. This can sufficiently prevent increase in driving voltage to be supplied to the operating piezoelectric cantilevers during the respective periods with the first partial drawing area and the second partial drawing area designated. Consequently, it is possible to improve the reliability of the light deflector while preventing an increase in load on some piezoelectric cantilevers and avoiding suspension of image projection.

Preferably, the plurality of piezoelectric cantilevers of the piezoelectric actuator are divided into a first group including piezoelectric cantilevers having an odd number and a second group including piezoelectric cantilevers having an even number according to an order in disposition in the meandering pattern arrangement, the light deflector includes a first electric supply wire which supplies the driving voltage to the piezoelectric cantilevers in the first group and a second electric supply wire which supplies the driving voltage to the piezoelectric cantilevers in the second group, the first electric supply wire and the second electric supply wire being separate wires, the first group corresponds to one of the one and the other parts, the second group corresponds to the other of the one and the other parts, the driving voltage control supplies the driving voltage to the one and the other parts via the first and the second electric supply wires respectively.

This exemplary structure enables the driving voltage control unit to switch supply of a driving voltage among supply to all the plurality of piezoelectric cantilevers, supply with the first combination, and supply with the second combination through simple switching between supplying and stopping supply of a driving voltage to the first electric supply wire and the second electric supply wire.

Preferably, the first and the second partial drawing areas are defined as drawing areas which are adjacent to each other and obtained by halving the standard drawing area, and the driving voltage control unit supplies the same driving voltage to the operating piezoelectric cantilever during a period with either the first partial drawing area or the second partial drawing area designated as the driving voltage during the period with the standard drawing area designated.

With the above, the driving voltage control unit does not need to change the driving voltage in response to whether the first partial drawing area or the second partial drawing area is designated.

Preferably, the light deflector includes a another piezoelectric actuator which actuates the mirror unit so that the mirror unit reciprocatively rotates around a main rotation axial line, the main rotation axial line orthogonally intersecting with a sub-rotation axial line as the rotation axial line, a main frequency of the reciprocative rotation of the mirror unit around the main rotation axial line being higher than a sub-frequency of the reciprocative rotation of the mirror unit around the sub-rotation axial line, the scanning light is scanned in two directions, namely, a main scanning direction corresponding to the reciprocative rotation of the mirror unit around the main rotation axial line and a sub-scanning direction corresponding to the reciprocative rotation of the mirror unit around the sub-rotation axial line, and the first partial drawing area and the second partial drawing area are drawing areas obtained by halving the standard drawing area in the sub-scanning direction.

With this exemplary structure, the first partial drawing area and the second partial drawing area, which are obtained by halving the standard drawing area, are drawing areas obtained by halving the standard drawing area in the sub-scanning direction. This enables smooth setting of the first partial drawing area and the second partial drawing area in the standard drawing area for drawing by the scanning light from the two-dimensional light deflector.

Preferably, the driving voltage control unit supplies a suspending-period driving voltage to each piezoelectric cantilever in a suspended-period, the suspending-period driving voltage having a polarity reversed from a polarity of the driving voltage in a driving-period and not producing a coercive electric field.

With this exemplary structure, a voltage having a reversed polarity is supplied to the suspended piezoelectric cantilever. This can accelerate heat diffusion of the material (for example, lead) that causes separation in the suspended piezoelectric cantilever.

BRIEF DESCRIPTION OF THE DRAWINGS

Some of the features and benefits of the invention having been stated, others will become apparent as the description proceeds when taken in conjunction with the accompanying drawings, in which:

FIG. 3 illustrates a process of control by the driving voltage control unit when the drawing area designating unit designates an upper drawing area as a drawing area;

FIG. 4 illustrates a process of control by the driving voltage control unit when the drawing area designating unit designates a lower drawing area as the drawing area; and FIG. 5 illustrates an experimental graph concerning check on electrical breakdown of a piezoelectric cantilever of a piezoelectric actuator with respect to various light deflectors.

DESCRIPTION OF THE PREFERRED EMBODIMENTS

The invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

[Complete Structure]

Figure 1:
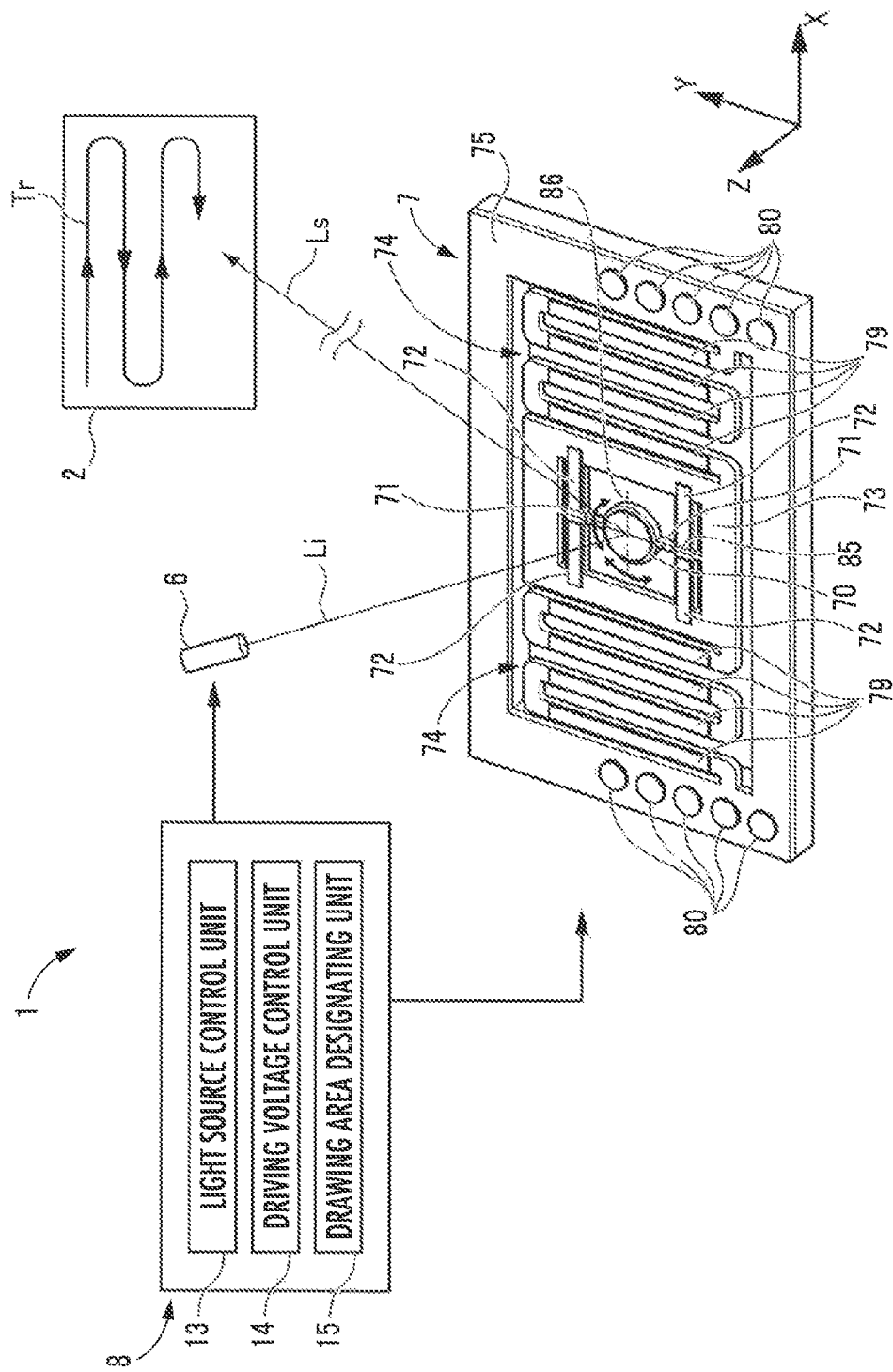
FIG. 1 is a diagram illustrating a structure of a major part of an irradiation apparatus.

FIG. 1 illustrates a structure of a major part of an irradiation apparatus 1. The irradiation apparatus 1 projects an image onto a screen 2. Note that an "image" in the present invention includes a light distribution pattern for vehicle lights, the pattern being expressed with only the light intensity distribution of white emitting light. The screen 2 can be a road surface, for example. FIG. 1 illustrates only major structural components that are directly related to the operations or the like to be described later among the structural components of the irradiation apparatus 1. Thus, the irradiation apparatus 1 includes structural components not illustrated. Those unillustrated structural components are known structural components equipped to a typical irradiation apparatus 1 (for example, an optical component for changing an optical path, a correction mirror to uniform a scanning speed, a projection lens, and an optical sensor).

The irradiation apparatus 1 includes a laser light source 6, a light deflector 7, and a control unit 8. The laser light source 6 radiates a laser beam that makes an incident light Li of the light deflector 7. The light deflector 7 generates a scanning light Ls out of the incident light Li to radiate. The scanning light Ls passes through an optical component not illustrated, then scans the screen 2 as a scan range, and forms a scan track Tr on the screen 2. Consequently, an image in conformity with the brightness of respective points on the scan track Tr is formed on the screen 2.

The control unit 8 includes a light source control unit 13, a driving voltage control unit 14, and a drawing area designating unit 15, and controls the brightness of the laser light source 6 and a driving voltage of the light deflector 7. Specifically, the light source control unit 13 controls a feed current of the laser light source 6 to thereby control the brightness of the laser light source 6. The brightness control for the laser light source 6 by the light source control unit 13 includes switching between turn-on and turn-off of the laser light source 6. The intensity of the incident light Li is related to the brightness of the laser light source 6, and also to the brightness of the respective points on the scan track Tr on the screen 2.

The driving voltage control unit 14 controls the driving voltage of the light deflector 7. The drawing area designating unit 15 designates a drawing area as a scan range on the screen 2 to be scanned with the scanning light Ls. The drawing area designated by the drawing area designating unit 15 (hereinafter discretionally referred to as "a designated drawing area") includes at least three areas, namely, an upper drawing area Fu, a lower drawing area Fd, and a whole drawing area Fw (for example, FIG. 2). The upper drawing area Fu, the lower drawing area Fd, and the whole drawing area Fw will be described later again referring to FIG. 2 and subsequent drawings.

The light source control unit 13 controls the brightness of the laser light source 6 according to the position and dimension of the designated drawing area on the screen 2. The driving voltage control unit 14 controls a driving voltage to be supplied to the light deflector 7 according to the position and dimension of the designated drawing area on the screen 2.

The light deflector 7 is an MEMS two-dimensional light deflector. As the structure itself of a two-dimensional light deflector is known from, for example, JP/P2017-134133 relevant to the present applicant, the structure of the light deflector 7 will be briefly described here.

The light deflector 7 includes a mirror unit 70, a torsion bar 71, a piezoelectric actuator 72, a movable frame 73, a piezoelectric actuator 74, and a fixed frame 75. For convenience in description of the structure of the light deflector 7, a triaxial orthogonal coordinate system based on the X axis, Y axis, and Z axis is defined. Specifically, the X axis and the Y axis are defined as the directions parallel to the respective longer and shorter edges of the rectangular light deflector 7. The Z axis is defined as a direction parallel to the width direction of the light deflector 7.

The mirror unit 70 is positioned at the center of the light deflector 7. A pair of torsion bars 71 project in the Y axial direction from the mirror unit 70 with the projecting ends of the torsion bars 71 connected to the inner circumference of the movable frame 73. Each of the four piezoelectric actuators 72 is made using a single piezoelectric cantilever. Each piezoelectric actuator 72 extends in the X axial direction so as to intervene between the torsion bar 71 and the movable frame 73.

A pair of piezoelectric actuators 74 is disposed outside the movable frame 73 in the X axial direction. Each piezoelectric actuator 74 includes a plurality of piezoelectric cantilevers 79 serially connected in a meandering pattern arrangement. A plurality of electrode pads 80 are exposed on the surface of the fixed frame 75. A driving voltage to be supplied from outside to the light deflector 7 is supplied to the electrode pads 80.

Each of the torsion bar 71 and the piezoelectric cantilever 79 has a known laminated structure (not illustrated). The laminated structure includes a lower electrode layer (for example, a metal cathode layer, to be hereinafter referred to as "cathode layer"), a piezoelectric layer made of a PZT piezoelectric film, and an upper electrode layer (for example, a metal anode layer, to be hereinafter referred to as an "anode layer") sequentially laminated from bottom to top on a substrate including an Si layer of a Silicon on Insulator (SOI) structure. The cathode layer and the anode layer are connected to respectively corresponding electrode pads 80 via respective internal wires to apply a driving voltage across the both surfaces of the piezoelectric film.

The cathode layer is common to the piezoelectric actuators 72, 74, and is at the ground potential (earth). Thus, the driving voltage via the internal wires is supplied only to the anode layers of the piezoelectric actuators 72, 74.

The piezoelectric actuators 72, 74, disposed inside and outside the movable frame 73, respectively, will be discretionally referred to as "an inside piezoelectric actuator 72" and "an outside piezoelectric actuator 74", respectively.

The inside piezoelectric actuator 72 actuates the mirror unit 70 so that the mirror unit 70 reciprocatively rotates around the main rotation axial line 85 as the axial line of the torsion bar 71. Meanwhile, the outside piezoelectric actuator 74 actuates the movable frame 73 so that the movable frame 73 reciprocatively rotates around the sub-rotation axial line 86 as an axial line parallel to the X axis. The mirror unit 70 reciprocatively rotates around the sub-rotation axial line 86 integrally together with the movable frame 73. The main rotation axial line 85 orthogonally intersects with the sub-rotation axial line 86 at the center of the mirror unit 70.

The reciprocative rotation of the mirror unit 70 around the main rotation axial line 85 is achieved by utilizing resonance. Meanwhile, the reciprocative rotation of the mirror unit 70 around the sub-rotation axial line 86 is achieved by utilizing only deformation of the piezoelectric cantilevers 79 around the sub-rotation axial line 86. The frequency of the reciprocative rotation of the mirror unit 70 around the main rotation axial line 85 is higher than the frequency of the reciprocative rotation of the mirror unit 70 around the sub-rotation axial line 86.

The light deflector 7 is a two-dimensional light deflector that causes the mirror unit 70 to reciprocatively rotate around the two respective rotation axial lines, namely, the main rotation axial line 85 and the sub-rotation axial line 86. The direction in which the scanning light Ls scans corresponding to the direction of the reciprocative rotation of the mirror unit 70 around the main rotation axial line 85 will be hereinafter referred to as a "main scanning direction". Meanwhile, the direction in which the scanning light Ls scans corresponding to the direction of the reciprocative rotation of the mirror unit 70 around the sub-rotation axial line 86 will be hereinafter referred to as a "sub-scanning direction".

The scanning light Ls scans the screen 2 in the horizontal and vertical directions of the screen 2. The scanning on the screen 2 with the scanning light Ls in the respective horizontal and vertical directions of the screen 2 corresponds to scanning with the scanning light Ls in the main scanning direction and the sub-scanning direction, respectively.

[Outside Piezoelectric Actuator]

The operation of the outside piezoelectric actuator 74 will be described in detail. The piezoelectric cantilevers 79 of the piezoelectric actuator 74 are divided into two groups, namely, an odd-numbered group (hereinafter simply referred to as an "odd group") and an even-numbered group (hereinafter simply referred to as an "even group") according to the order in disposition of the piezoelectric cantilevers 79 in the X axial direction from the side with the movable frame 73 (on the tip end side) to the side with the fixed frame 75 (the base end side).

As a wire for supplying a driving voltage to the anode layer of each piezoelectric actuator 74 in the electrode pad 80, two wires, namely, a wire for the odd group and a wire for the even group, are prepared. The wire for the odd group is common to the piezoelectric cantilevers 79 in the odd group, and the wire for the even group is common to those in the even group. In normal supply of a driving voltage to the outside fixed frame 75 by the driving voltage control unit 14, a driving voltage for the wire for the odd group and a driving voltage for the wire for the even group have mutually reversed phases (refer to FIG. 2 to be described later).

With a larger driving voltage supplied, each piezoelectric cantilever 79 deflects more in the width direction due to piezoelectric deformation. Meanwhile, with no driving voltage supplied, each piezoelectric cantilever 79 remains a planar (flat) shape, not being curbed.

In the piezoelectric actuator 74 including the plurality of piezoelectric cantilevers 79 in a meandering pattern arrangement, the swing direction in which the odd-numbered piezoelectric cantilevers 79 curves is opposite from the swing direction in which the even-numbered piezoelectric cantilever 79 curves. The swing direction contributes to the swing angle (hereinafter referred to as a "vertical swing angle") of the mirror unit 70 around the X axis. That is, the curving of the odd-numbered piezoelectric cantilever 79 acts on the minus side of a vertical swing angle (refer to the drawing second from the top in FIG. 4 to be described later) relative to the mirror unit 70. Meanwhile, the curving of the even-numbered piezoelectric cantilever 79 acts on the plus side of a vertical swing angle (refer to the drawing second from the top in FIG. 3 to be described later), relative to the mirror unit 70.

As a result of supplying driving voltages having mutually reversed phases to the wire for the odd group and the wire for the even group, respectively, by the driving voltage control unit 14, the mirror unit 70 vertically swings at the identical swing angles δ (δ=4° in FIG. 2 to FIG. 4 to be described later) on the respective sides with the swing angle at the center of the range of the swing angle of the mirror unit 70 in the vertical direction as 0°. In other words, the mirror unit 70 reciprocatively swings within the range of ±δ with 0° at the center. Note that discretional inclusion of an offset voltage in the driving voltage enables vertical displacement of the position with the swing angle=0° in the vertical direction by an amount corresponding to the offset amount.

[Temporal Suspension of Piezoelectric Cantilever]

Figure 2:
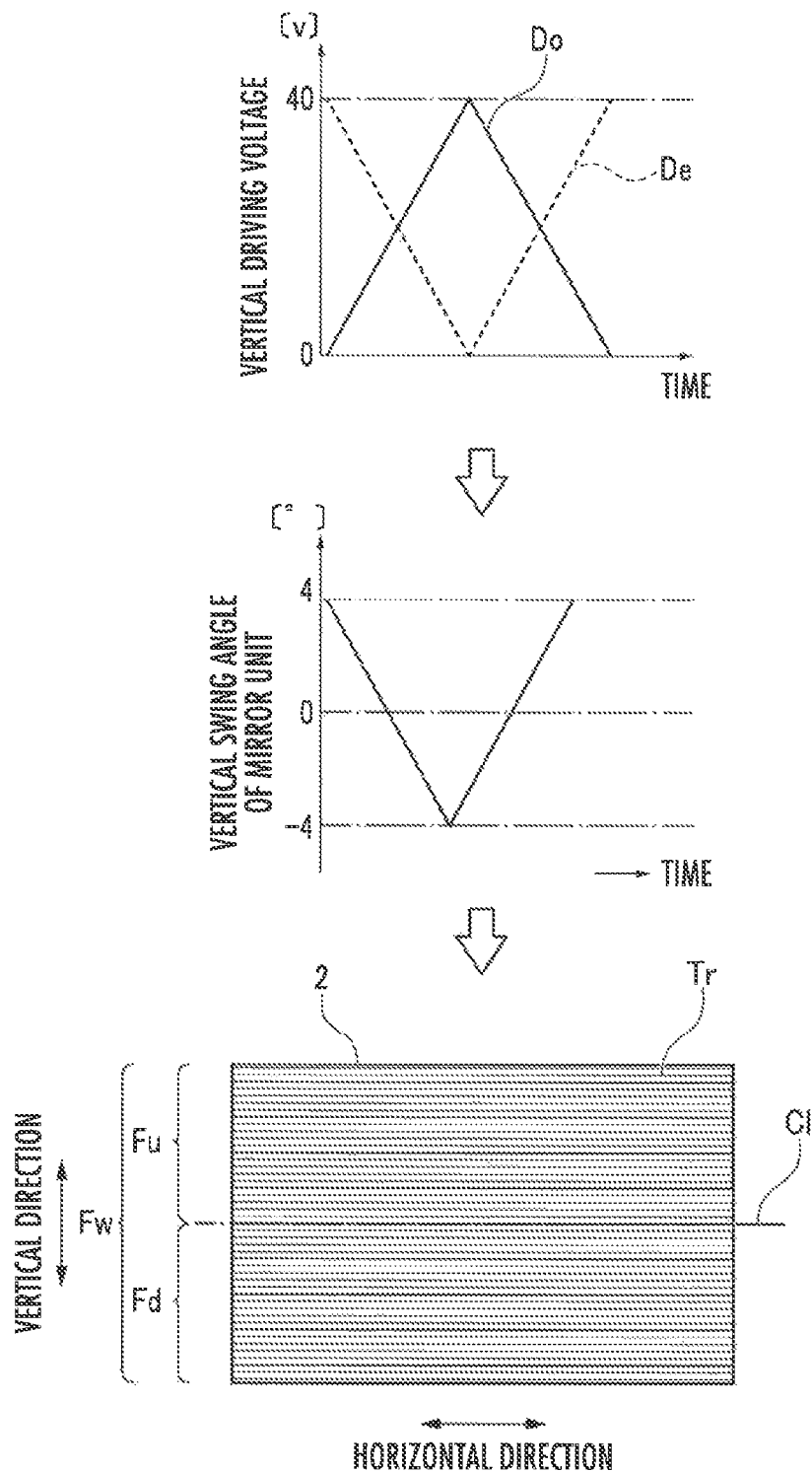
FIG. 2 illustrates a process of control by a driving voltage control unit when a drawing area designating unit designates a whole drawing area as a drawing area.

FIG. 2 to FIG. 4 illustrate the process of control by the driving voltage control unit 14 when the drawing area designating unit 15 designates a whole drawing area Fw, an upper drawing area Fu, and a lower drawing area Fd, respectively, as a drawing area. The whole drawing area Fw, the upper drawing area Fu, and the lower drawing area Fd will be described later. Among the three drawings concerning the control process, the top drawing illustrates a vertical driving voltage as a driving voltage for the piezoelectric cantilevers 79 of the piezoelectric actuator 74 in accordance with a designated drawing area designated by the drawing area designating unit 15. In the illustrated example, the vertical driving voltage varies within the range between 0 V and 40 V.

The drawing second from the top illustrates a vertical swing angle as a rotation angle of the mirror unit 70 around the X axis in conformity with the vertical driving voltage. In the illustrated example, assuming that the reference swing angle of the vertical swing angle is 0°, maximum vertical swing angles δ in the respective plus and minus directions are 4°. That is, the mirror unit 70 changes the vertical swing angle in the range between −4° and +4°. The vertical swing angles equal to −4° and +4° of the mirror unit 70 correspond to the vertical driving voltages at 0 V and 40 V, respectively.

The bottom drawing illustrates a drawing area as the range of a scan track Tr formed on the screen 2 in accordance with the vertical swing angle. The drawing area formed on the screen 2 in accordance with the vertical swing angle corresponds to the designated drawing area designated by the drawing area designating unit 15.

On the screen 2 in FIG. 2, a bisector Cl runs through the center of the screen 2, extending in the horizontal direction of the screen 2. The bisector Cl corresponds to the vertical swing angle at 0° of the mirror unit 70. The center of the screen 2 is set here at the cross point at which two diagonal lines of the rectangular screen 2 intersect with each other.

The whole drawing area Fw occupies the entire screen 2. The whole drawing area Fw is equally divided into two areas, namely, the upper drawing area Fu and the lower drawing area Fd, in the vertical direction by the bisector Cl. The upper drawing area Fu and the lower drawing area Fd are defined as partial drawing areas located inside the whole drawing area Fw in different positions.

The bisector Cl is a common boundary between the upper drawing area Fu and the lower drawing area Fd. The upper drawing area Fu and the lower drawing area Fd are adjacent to each other along the bisector Cl without overlap inside the whole drawing area Fw.

A vertical voltage illustrated in the top drawing in FIG. 2 concerning the process of control will now be described. As described above, the designated drawing area is assumed to be the whole drawing area Fw in FIG. 2. When the vertical swing angle of the mirror unit 70 is 0°, the scan track Tr is formed on the bisector Cl.

In FIG. 2, driving voltages Do, De are driving voltages (a vertical driving voltage) to be supplied to the piezoelectric cantilevers 79 in the odd group and the piezoelectric cantilevers 79 in the even group, respectively. In FIG. 2, the driving voltages Do, De for one cycle are illustrated. One cycle of the vertical driving voltage corresponds to a period of time for the scanning light Ls to vertically reciprocate once on the screen 2. Assuming that one vertical way for the scanning light Ls to follow on the screen 2 is one field, one cycle of the frame of an image to be formed on the screen 2 is equal to the period of time for the scanning light Ls to vertically reciprocate once on the screen 2.

With the driving voltage Do equal to the driving voltage De, the vertical swing angle of the mirror unit 70 is 0°. With the driving voltage Do larger than the driving voltage De, the vertical swing angle of the mirror unit 70 is smaller than 0°. With the driving voltage Do smaller than the driving voltage De, the vertical swing angle of the mirror unit 70 is larger than 0°.

During a period with the whole drawing area Fw designated, both the driving voltages Do, De are generated. Specifically, a driving voltage is supplied to both the internal wire connected to the piezoelectric cantilevers 79 in the even group and the internal wire connected to the piezoelectric cantilevers 79 in the odd group. Accordingly, the scan track Tr is formed over the entire screen 2.

In actual, the light deflector 7 is enclosed in a package (not illustrated) having a window. A transparent light-transmissible member, such as, glass, is fit in the window. The incident light Li from the laser light source 6 enters the package via the window glass. The incident light Li is then reflected on the mirror unit 70 of the light deflector 7 to be formed into a scanning light Ls, which is then radiated to outside the package via the window.

As the light reflection rate of the mirror unit 70 is not 100%, the temperature inside the mirror unit 70 of the light deflector 7 enclosed in the package becomes very high while the irradiation apparatus 1 is in operation. Meanwhile, the lead contained in the PZT film (a piezoelectric film) of the piezoelectric actuator 74 moves toward the cathode layer because of the high temperature and an electric field directed from the anode to the cathode (the ground potential or earth), so that an uneven distribution state results. Uneven distribution of lead such that more lead accumulates in an area closer to the cathode layer in the PZT film causes separation of the PZT film from the cathode layer.

To address the above, the irradiation apparatus 1 suspends corresponding half of the piezoelectric cantilevers 79 during respective periods in which the designated drawing area designated by the drawing area designating unit 15 is the upper drawing area Fu and the lower drawing area Fd, whereby the uneven distribution of lead is eliminated while the piezoelectric cantilevers 79 are suspended.

Before going to the description on a concrete manner for elimination, some terms are defined in advance. A piezoelectric cantilever 79 to which a driving voltage is supplied is defined as "an operating piezoelectric cantilever 79". A piezoelectric cantilever 79 to which supply of a driving voltage is stopped is defined as "a suspended piezoelectric cantilever 79". A combination of the driving voltages to be supplied to make the piezoelectric cantilevers 79 in an even group the operating piezoelectric cantilevers 79 and those in the odd group the suspended piezoelectric cantilevers 79 is defined as the "first combination". A combination of the driving voltages to be supplied to make the piezoelectric cantilevers 79 in the odd group the operating piezoelectric cantilevers 79 and those in the even group the suspended piezoelectric cantilevers 79 is defined as the "second combination". Between the first combination and the second combination, the relationship between the operating piezoelectric cantilever 79 and the suspended piezoelectric cantilever 79 is opposite from each other.

In FIG. 3, the driving voltage control unit 14 controls supply of a driving voltage to the piezoelectric cantilevers 79 with the first combination. That is, while the driving voltage De is supplied to the piezoelectric cantilevers 79 in the even group, supply of the driving voltage Do to the piezoelectric cantilevers 79 in the odd group is stopped. Consequently, no driving voltage is supplied to the PZT film of the piezoelectric cantilevers 79 in the odd group, and the PZT film keeps its flat shape.

During a period when the driving voltage control unit 14 drives the piezoelectric cantilevers 79 with the first combination, the laser light source 6 keeps lighting. Thus, the incident light Li enters the mirror unit 70 of the light deflector 7 in the package, and the temperature inside the package is kept high. Consequently, the lead in the PZT film of the piezoelectric cantilevers 79 in the odd group, which are suspended, thermally diffuses due to the high temperature and loss of electric field due to stopped application of the driving voltage. Accordingly, the distribution of the lead in the PZT film is uniformed, whereby the uneven distribution is eliminated.

Meanwhile, the piezoelectric cantilevers 79 in the even group is kept supplied with the driving voltage De via the internal wire for the even group also during a period with the upper drawing area Fu designated as a designated drawing area, the driving voltage De being the same as a driving voltage to be supplied during a period with the whole drawing area Fw designated as a designated drawing area. With the above, the range of the swing angle of the mirror unit 70 results in between 0° and +δ. Accordingly, the scan track Tr is formed only in an area above the bisector Cl on the screen 2, whereby the upper drawing area Fu is formed.

The upper drawing area Fu is a partial drawing area that is half of the whole drawing area Fw in the vertical direction on the screen 2. Thus, the driving voltage De in forming the upper drawing area Fu is the same as, that is, not increased from, the driving voltage De in forming the whole drawing area Fw. Note that increasing or decreasing the maximum value of the driving voltage De enables vertical displacement of the upper edge of the upper drawing area Fu while keeping the lower edge of the upper drawing area Fu on the bisector Cl.

In FIG. 4, the driving voltage control unit 14 controls supply of a driving voltage to the piezoelectric cantilevers 79 with the second combination. That is, while the driving voltage Do is supplied to the piezoelectric cantilevers 79 in the odd group, supply of the driving voltage De to the piezoelectric cantilevers 79 in the even group is stopped. Consequently, no driving voltage is supplied to the PZT film of the piezoelectric cantilevers 79 in the even group, and the PZT film keeps its flat shape.

During a period when the driving voltage control unit 14 drives the piezoelectric cantilevers 79 with the second combination, the laser light source 6 keeps lighting. Thus, the incident light Li enters the mirror unit 70 of the light deflector 7 in the package, and the temperature inside the package is kept high. Consequently, the lead in the PZT film of the piezoelectric cantilevers 79 in the even group, which are suspended, thermally diffuses due to the high temperature and loss of electric field. Accordingly, the distribution of the lead in the PZT film is uniformed, whereby the uneven distribution is eliminated.

Meanwhile, the piezoelectric cantilevers 79 in the odd group is kept supplied with the driving voltage Do via the internal wire for the odd group also during a period with the lower drawing area Fd designated as a designated drawing area, the driving voltage Do being the same as a driving voltage to be supplied during a period with the whole drawing area Fw designated as a designated drawing area. With the above, the range of the swing angle of the mirror unit 70 results in between 0° and −δ. Accordingly, the scan track Tr is formed only in an area below the bisector Cl on the screen 2, whereby the lower drawing area Fd is formed.

The lower drawing area Fd is a partial drawing area that is half of the whole drawing area Fw in the vertical direction on the screen 2. Thus, the driving voltage Do in forming the lower drawing area Fd is the same as, that is, not increased from, the driving voltage Do in forming the whole drawing area Fw. Note that increasing or decreasing the maximum value of the driving voltage Do enables vertical displacement of the lower edge of the lower drawing area Fd while keeping the upper edge of the lower drawing area Fd on the bisector Cl.

[Supply of Voltage Having Reversed Polarity]

In the irradiation apparatus 1, the driving voltage control unit 14 stops supplying a driving voltage to the suspended piezoelectric cantilevers. Alternatively, instead of stopping supplying a driving voltage to the suspended piezoelectric cantilevers, the driving voltage control unit 14 can supply a voltage to the suspended piezoelectric cantilevers, the voltage having a polarity reversed from the polarity of a driving voltage to be supplied when the suspended piezoelectric cantilevers are driven as operating piezoelectric cantilevers, the voltage being within a range in which an electric field of a piezoelectric body of the suspended piezoelectric cantilever does not exceed the coercive electric field. With the above, the thermal diffusion of the material that causes separation of the piezoelectric film of the suspended piezoelectric cantilever is further accelerated by the reversed electric field.

[Experimental Result of Electrical Breakdown]

FIG. 5 illustrates an experimental graph concerning check on electrical breakdown of the piezoelectric cantilever 79 of the piezoelectric actuator 74 with respect to various light deflectors M1, M2, N1. In FIG. 5, the abscissa indicates time, while the ordinate indicates the relative capacitance (the relative value of electrostatic capacitance relative to the initial value) of the piezoelectric cantilever 79 of the piezoelectric actuator 74. In this experiment, a constant cycle T is set, the cycle T is divided into three, the whole drawing area Fw is formed in the first T/3 cycle, the upper drawing area Fu is formed in the following T/3 cycle, the lower drawing area Fd is formed in the last T/3 cycle, and the cycle T is repeated many times.

In the light deflector M1, the driving voltage control unit 14 drives the piezoelectric cantilever 79 of the piezoelectric actuator 74 with the first combination during a period with the upper drawing area Fu designated as a designated drawing area, as described referring to FIG. 3. During a period with the lower drawing area Fd designated as a designated drawing area, the piezoelectric cantilever 79 of the piezoelectric actuator 74 is driven with the second combination, as described referring to FIG. 4.

In the light deflector M2, the above-mentioned voltage having a reversed polarity is supplied to the suspended piezoelectric cantilever 79, in addition to driving the piezoelectric cantilever 79 with the first combination and the second combination in the light deflector M1.

The light deflector N1 employs a drive method for driving the piezoelectric cantilever 79 of the piezoelectric actuator 74 of the light deflector 7 in a conventional irradiation apparatus. In a conventional irradiation apparatus, a driving voltage is supplied to all the piezoelectric cantilevers 79, rather than having a suspended piezoelectric cantilever 79, even during respective periods for formation of the upper drawing area Fu and the lower drawing area Fd. That is, all the piezoelectric cantilevers 79 are kept as the operating piezoelectric cantilevers 79 irrespective of the designated drawing area.

In the light deflector N1, the respective amounts of change (the difference between a maximum value and a minimum value, being different from the amplitude) of the driving voltages Do, De during respective periods for formation of the upper drawing area Fu and the lower drawing area Fd are half of the respective amounts of change of the driving voltages Do, De during a period for formation of the whole drawing area Fw. Specifically, during a period for formation of the upper drawing area Fu, a bias voltage 20 V is added to the driving voltage De. The driving voltage Do changes with an inverted V-shaped waveform in each cycle within the range of voltage between 0 V and 20 V. Meanwhile, the driving voltage De changes with a V-shaped waveform in each cycle within the range of voltage between 20 V and 40 V.

In the light deflector N1, during a period for formation of the lower drawing area Fd, a bias voltage 20 V is added to the driving voltage Do. The driving voltage Do changes with an inverted V-shaped waveform in each cycle within the range of voltage between 20 V and 40 V. Meanwhile, the driving voltage De changes with a V-shaped waveform in each cycle within the range of voltage between 0 V and 20 V.

In FIG. 5, the white circles, the white triangles, and the black squares indicate plot points (measurement points) for the light deflectors M1, M2, N1, respectively. In a typical light deflector 7, when the electrostatic capacitance of a piezoelectric actuator has dropped to 80% or less of that at the initial value in an experiment (a relative capacitance of 80%), it can be assumed that electrical breakdown has occurred in the light deflector 7.

Ba and Bx indicate plot points at which electrical breakdown, that is, separation of the PZT film of the piezoelectric actuator 74 from the cathode layer, is assumed to have occurred in the piezoelectric actuators 74 of the light deflector M1 and the light deflector N1, respectively. Electrical breakdown here does not mean separation of the entire PZT film of the piezoelectric actuator 74 but means separation at a tolerable rate or larger. It can be known from comparison in time between Ba and Bx that the period of time until separation of the PZT film is significantly prolonged.

Bb is a plot point at which a small-scale electrical breakdown is assumed to have occurred in the piezoelectric actuator 74 of the light deflector M2. Electrical breakdown in the light deflector M2 is not caused due to separation of the PZT film from the cathode layer. Electrical breakdown of a piezoelectrical film can occur due to any causes other than separation of a PZT film. Electrical breakdown at Bb is considered to be a smaller-scale electrical breakdown having occurred due to some cause before the relative capacitance has dropped to 80% or less (no interfacial separation of PZT can be assumed having occurred yet at Bb because the light deflector M2 has a relatively large relative capacitance at Bb). It can be known from comparison in time between Ba and Bb that supply of a voltage having a reversed polarity to the suspended piezoelectric cantilever 79 enables further prevention of separation of the PZT film.

Modified Examples

The whole drawing area Fw, the upper drawing area Fu, and the lower drawing area Fd in the light deflector 7 correspond to the standard drawing area, the first partial drawing area, and the second partial drawing area, respectively, in the present invention. The upper drawing area Fu and the lower drawing area Fd are partial drawing areas obtained by bisecting the whole drawing area Fw along the bisector Cl. The whole drawing area Fw is a maximum drawing area on the screen 2, though the standard drawing area in the present invention may not be a maximum drawing area.

The first partial drawing area and the second partial drawing area in the present invention may be partial drawing areas obtained by simply dividing, rather than equally dividing, the standard drawing area into two parts. Further, the first partial drawing area and the second partial drawing area in the present invention may be partial drawing areas obtained by dividing the standard drawing area into three parts in the vertical direction and determining two different parts as the first partial drawing area and the second partial drawing area.

The piezoelectric cantilevers 79 in the even group and the piezoelectric cantilevers 79 in the odd group in the light deflector 7 correspond to the piezoelectric cantilevers in the first group and the piezoelectric cantilevers in the second group, respectively, in the present invention. The piezoelectric cantilevers in the first group and the piezoelectric cantilevers in the second group in the present invention may be the piezoelectric cantilevers in the odd group and the piezoelectric cantilevers in the even group, respectively.

The internal wire to the piezoelectric cantilevers 79 in the even group and the internal wire to the piezoelectric cantilevers 79 in the odd group in the light deflector 7 correspond to the first electric supply wire and the second electric supply wire, respectively, in the present invention. Alternatively, the first electric supply wire and the second electric supply wire in the present invention may be the internal wire to the piezoelectric cantilevers 79 in the odd group and the internal wire to the piezoelectric cantilevers 79 in the even group, respectively.

The light deflector 7 uses a PZT film as the piezoelectric films of the piezoelectric cantilevers 79 of the inside piezoelectric actuator 72 and of the outside piezoelectric actuator 74, respectively. Alternatively, any film other than a PZT film can be used as the piezoelectric film of the piezoelectric cantilever in the present invention. Further, a material that causes separation inside a piezoelectric film in the present invention can be other than lead.

The irradiation apparatus 1 uses the laser light source 6. The light source in the present invention is not limited to a laser light source, but may be any light source other than a laser light source.

It will be appreciated by persons skilled in the art that the disclosed technique is not limited to what has been particularly shown and described hereinabove. Rather the scope of the disclosed technique is defined only by the claims, which follow.

What is claimed is:

1. An irradiation apparatus, comprising:
   a light source;
   a light deflector including a mirror unit which reciprocatively rotates around a rotation axial line and reflects an incident light from the light source to radiate a scanning light, and a piezoelectric actuator having a plurality of piezoelectric cantilevers serially connected in a meandering pattern arrangement, the piezoelectric actuator being configured to actuate the piezoelectric cantilevers with a driving voltage supplied from outside to cause the mirror unit to reciprocatively rotate around the rotation axial line;
   a drawing area designating unit which designates a designated drawing area, scanned by the scanning light, among a standard drawing area, a first partial drawing area and a second partial drawing area, the first partial drawing area and the second partial drawing area being located inside the standard drawing area in different positions;
   a light source control unit which controls the brightness of the light source according to the designated drawing area; and
   a driving voltage control unit which controls combinations of operating piezoelectric cantilevers supplied with the driving voltage and suspended piezoelectric cantilevers not supplied with the driving voltage, the combinations including: a standard combination, corresponding to the standard drawing area, of both one and the other parts of the plurality of piezoelectric cantilevers being the operating piezoelectric cantilevers; a first combination, corresponding to the first partial drawing area, of the one and the other parts being the operating and the suspending piezoelectric cantilevers respectively; and a second combination of the one and the other parts being the suspending and the operating piezoelectric cantilevers respectively,
   wherein the driving voltage control unit supplies a suspending-period driving voltage to each piezoelectric cantilever in a suspended-period, the suspending-period driving voltage having a polarity reversed from a polarity of the driving voltage in a driving-period and not producing a coercive electric field.

2. The irradiation apparatus according to claim 1, wherein the plurality of piezoelectric cantilevers of the piezoelectric actuator are divided into a first group including piezoelectric cantilevers having an odd number and a second group including piezoelectric cantilevers having an even number according to an order in disposition in the meandering pattern arrangement,
   the light deflector includes a first electric supply wire which supplies the driving voltage to the piezoelectric cantilevers in the first group and a second electric supply wire which supplies the driving voltage to the piezoelectric cantilevers in the second group, the first electric supply wire and the second electric supply wire being separate wires,
   the first group corresponds to one of the one and the other parts,
   the second group corresponds to the other of the one and the other parts,
   the driving voltage control supplies the driving voltage to the one and the other parts via the first and the second electric supply wires respectively.

3. The irradiation apparatus according to claim 2, wherein the first and the second partial drawing areas are defined as drawing areas which are adjacent to each other and obtained by halving the standard drawing area, and
   the driving voltage control unit supplies the same driving voltage to the operating piezoelectric cantilever during a period with either the first partial drawing area or the second partial drawing area designated as the driving voltage during the period with the standard drawing area designated.

4. The irradiation apparatus according to claim 3, wherein the light deflector includes a another piezoelectric actuator which actuates the mirror unit so that the mirror unit reciprocatively rotates around a main rotation axial line, the main rotation axial line orthogonally intersecting with a sub-rotation axial line as the rotation axial line, a main frequency of the reciprocative rotation of the mirror unit around the main rotation axial line being higher than a sub-frequency of the reciprocative rotation of the mirror unit around the sub-rotation axial line, the scanning light is scanned in two directions, namely, a main scanning direction corresponding to the reciprocative rotation of the mirror unit around the main rotation axial line and a sub-scanning direction corresponding to the reciprocative rotation of the mirror unit around the sub-rotation axial line, and the first partial drawing area and the second partial drawing area are drawing areas obtained by halving the standard drawing area in the sub-scanning direction.

5. An irradiation apparatus, comprising:

a light source;

a light deflector including a mirror unit which reciprocatively rotates around a rotation axial line and reflects an incident light from the light source to radiate a scanning light, and a piezoelectric actuator having a plurality of piezoelectric cantilevers serially connected in a meandering pattern arrangement, the piezoelectric actuator being configured to actuate the piezoelectric cantilevers with a driving voltage supplied from outside to cause the mirror unit to reciprocatively rotate around the rotation axial line;

a light source control unit which controls the brightness of the light source; and a driving voltage control unit which controls the driving voltage of the plurality of piezoelectric cantilevers, wherein the driving voltage control unit controls by switching combinations of operating piezoelectric cantilevers supplied with the driving voltage and suspended piezoelectric cantilevers not supplied with the driving voltage, the combinations including:

a first combination of one and the other parts being the operating and the suspending piezoelectric cantilevers respectively; and a second combination of the one and the other parts being the suspending and the operating piezoelectric cantilevers respectively, wherein the driving voltage control unit supplies a suspending-period driving voltage to each piezoelectric cantilever in a suspended-period, the suspending-period driving voltage having a polarity reversed from a polarity of the driving voltage in a driving-period and not producing a coercive electric field.

* * * * *